United States Patent [19]

Field et al.

[11] Patent Number: 4,820,424
[45] Date of Patent: Apr. 11, 1989

[54] PRODUCTS AND PROCESSES FOR THE FLOCCULATION OF AQUEOUS SUSPENSIONS

[75] Inventors: John R. Field; Nicholas D. Smith, both of West Yorkshire, England

[73] Assignee: Allied Colloids Ltd., England

[21] Appl. No.: 78,033

[22] Filed: Jul. 27, 1987

[30] Foreign Application Priority Data

Jul. 28, 1986 [GB] United Kingdom ............... 8618339

[51] Int. Cl.$^4$ .................................................. C02F 1/56
[52] U.S. Cl. ..................................... 210/716; 210/727; 210/728; 210/734; 252/176; 252/181
[58] Field of Search ............... 210/728, 716, 732–736, 210/738, 727; 252/175, 176, 181; 264/122

[56] References Cited

U.S. PATENT DOCUMENTS

| | | | |
|---|---|---|---|
| 2,045,335 | 6/1936 | Reynolds | 210/698 |
| 3,839,202 | 10/1974 | Roy | 210/732 |
| 3,860,526 | 1/1975 | Corbett | 210/733 |
| 3,876,573 | 4/1975 | Engelhardt et al. | 210/734 |
| 3,953,330 | 4/1976 | Tonkyn et al. | 210/728 |
| 4,457,842 | 7/1984 | Bereiter | 210/732 |
| 4,582,627 | 4/1986 | Carlsson | 210/734 |

FOREIGN PATENT DOCUMENTS

| | | | |
|---|---|---|---|
| 47-26584 | 7/1972 | Japan . | |
| 55-127109 | 10/1980 | Japan | 210/728 |
| 56-115605 | 9/1981 | Japan | 210/728 |
| 57-63109 | 4/1982 | Japan | 210/734 |
| 58-58117 | 4/1983 | Japan | 210/181 |
| 58-74106 | 5/1983 | Japan | 210/732 |
| 58-98184 | 6/1983 | Japan | 210/734 |
| 1188394 | 4/1970 | United Kingdom . | |
| 1501099 | 2/1978 | United Kingdom | 210/734 |
| 1512022 | 5/1978 | United Kingdom . | |

*Primary Examiner*—Peter Hruskoci
*Attorney, Agent, or Firm*—Ostrolenk, Faber, Gerb & Soffen

[57] ABSTRACT

An aqueous organic or inorganic suspension can be coagulated and then flocculated by flowing it past a shaped body comprising a mixture of water soluble multivalent metal coagulant and a water soluble organic polymeric flocculant in the form of substantially discrete particles. The surface of the shaped body is eroded by the flowing stream to form a solution of the coagulant in which the polymeric flocculant particles are entrained, and these subsequently dissolve into the suspension.

14 Claims, No Drawings

PRODUCTS AND PROCESSES FOR THE FLOCCULATION OF AQUEOUS SUSPENSIONS

In order to separate suspended solids from an aqueous suspension, for instance during the clarification of water, it is common to treat the water sequentially, first with a solution of a multivalent metal coagulant and then with a solution of a high molecular weight polymeric bridging flocculant. Typically the multivalent metal coagulant destabilises the system by precipitating soluble and colloidal matter and coagulating the solids, causing them to form microflocs, and the microflocs or other coagulated solids are then flocculated by the bridging flocculant to form relatively large flocs and these can be separated from the water in conventional manner.

The sequential treatment is normally conducted by dosing into the suspension an aqueous solution of the multivalent metal coagulant and thereafter dosing an aqueous solution of the flocculant.

Instead of adding coagulant to an aqueous solution by dosing a previously formed solution of the coagulant, it is also known to flow the suspension past a block of the multivalent metal salt. This dissolves slowly into the suspension, thereby inducing coagulation. Similarly, instead of dosing dissolved flocculant into the suspension it is known to flow the suspension past a block formed from a blend of particulate polymeric flocculant and a simple salt such as sodium carbonate. The flocculant gradually dissolves from the block into the suspension. However there can be a tendency for the surface of the block to gel undesirably and resist further dissolution. Also the blocks are expensive, per unit weight of polymer, as they have to include additional materials, such as simple salts, to aid dissolution eg by minimising gelling problems and to aid binding. Additionally, the polymer block requires the inclusion of further material to act as binder.

If an attempt is made to dose both coagulant and flocculant into a suspension by use of both types of blocks in sequence, difficulties are experienced in operation due to the use of two separate blocks often at difficult locations and which may dissolve at different rates. Because of the difficulties for the operator, the results are unsatisfactory.

In GB No. 1,512,022 it is proposed to provide a concentrated aqueous solution containing both inorganic material and cationic polymer and so if this solution is used it will result in simultaneous dosing of coagulant and flocculant. Similarly in U.S. Pat. No. 4,582,627 it is proposed to dose organic and inorganic components simultaneously into the water that is to be treated.

In Japanese Examined Application No. 47-26584 (application No. 44-102922) a foamed block is formed from 27% polyacrylic acid ester polymer, 3% alginate polymer, 60% aluminium sulphate, 8% water and 2% of a foam-forming material. The polyacrylic acid ester polymer is said to have molecular weight of 10,000 or more and so it probably is not a high molecular weight polymeric flocculant. Irrespective of this, the presence of the water during the formation of the mix inevitably means that the polyacrylic acid ester polymer will be in swollen, sticky or dissolved form during the formation of the block and so, even if the polymer was introduced initially as particles, the particles would tend to cohere to one another and to the other particles in the block, and would not be discrete. When the block is contacted with flowing water, the interconnected network of polymer particles will dissolve only relatively slowly and will tend to form a film of gel over the block. This problem is minimised to some extent by the block being foamed, but in any event the polymer and the coagulant will dissolve substantially simultaneously into the water.

The known methods of supplying organic polymeric flocculant and inorganic coagulant in a single composition therefore result in the water being treated simultaneously by the flocculant and the coagulant. It would be desirable to provide a composition by which a single product could be used to treat water sequentially with coagulant and then with polymeric flocculant.

A shaped body according to the invention comprises a mixture of water soluble multivalent metal coagulant and water soluble organic polymeric flocculant and the polymeric flocculant is in the form of substantially discrete particles and the surface of the body is erodable by immersion in a flowing stream of water to form a solution of the coagulant in which the polymeric flocculant particles are entrained.

It is essential in the invention that the polymeric flocculant particles should be in susbtantially discrete form within the shaped body. Thus they must not cohere into a continuous network but instead must be sufficiently discrete that erosion of the surface of the body with flowing water causes the particles to be released from the body and to be entrained in the flowing water. Naturally the substantially discrete particles can themselves be clusters of smaller particles, provided the clusters can be eroded from the body by, and entrained in, flowing water.

A method according to the invention of treating an aqueous suspension with a multivalent metal coagulant and then with an organic polymeric flocculant comprises flowing the suspension past a shaped body comprising a mixture of water soluble multivalent metal coagulant and water soluble polymeric flocculant, and the flocculant is in the form of discrete particles and the flowing stream erodes the body by dissolving the coagulant and thereby releasing the polymer particles from the body, and the particles are entrained in, and gradually dissolved into, the flowing stream.

Thus any particular unit volume of aqueous suspension contacts the shaped body and is initially treated by polyvalent metal coagulant that dissolves from the body. At the same time as dissolving the coagulant into this unit volume of aqueous suspension, polymer particles are released from the body and are entrained into the unit volume of suspension. The suspension, which has by then been treated by the coagulant, flows away from the shaped body and the polymer particles gradually dissolve into the suspension, thereby treating the suspension with the polymeric flocculant.

If the flocculant particles are bonded into a coherent network instead of being discrete, or if they are present in too high a proportion, contact with the flowing stream will tend to result in formation of an overall film of gelled polymer around the shaped body and this will inhibit the erosion of the surface and the release of the polymeric particles. As a result the water is then treated either by coagulant and polymer simultaneously or, in many instances, the film of gelled polymer may restrict the dissolution of the surface to such an extent that the rates of dissolution of both the coagulant and flocculant are too low.

In order that the surface of the body is erodable by aa flowing stream to release the polymeric particles, substantially without the formation of an inhibiting gel film around the body, the polymeric particles must be separated by a substantial volume of non-polymeric material. Generally the amount of non-polymeric particles is at least 50%, preferably at least 70% or 80% and most preferably at least 87%, by volume of the total volume of the shaped body. The separating material may include or consist of, for example, a coating on the flocculant particles but preferably the mixture comprises a mixture of flocculant particles and other particles. These other particles can be any water soluble particles that will not interfere with the process and that will serve to keep the polymer particles separate during the erosion. Preferably most of these particles, and preferably substantially all of these particles, are particles of the metal coagulant.

The shaped body can include additional coagulant, for instance larger pieces of coagulant included within it, or additional coagulant may be incorporated in the flowing stream during use. Preferably however the mixture in the shaped body is a substantially uniform mixture of the polymer particles with the coagulant that is required for the process, all the coagulant being in the form of particles in the mixture.

An additional advantage of the mixture including most or all of the coagulant is that dissolution of the coagulant provides, around the eroding surface of the body, a solution having a high electrolyte or ionic content. This inhibits dissolution of the polymeric flocculant and so promotes the erosion of the flocculant particles from the surface and their entrainment in the flowing stream while substantially undissolved, and thus inhibits the tendency to form a film of polymer gel around the shaped body.

The ratio by volume between coagulant or other particles and flocculant particles will be chosen having regard to the particular materials and the velocity of the flowing stream. For instance if the rate of flow is very low it may be necessary to use a lower amount of polymer particles than if the rate of flow is higher. Typically the rate of flow is at least 5, and preferably at least 10 meters per minute, often 10 to 20 meters per minute. However it can be higher, e.g., up to 30 meters per minute.

Preferably the ratio by volume of coagulant or other particles to flocculant particles is at least 80:20 and most preferably is at least 87:13. It is generally unnecessary for it to be above 99:1 and is usually below 95:5.

The ratio by weight is often 90:10 or more but satisfactory results can in some instances be achieved with values of, for instance, 85:15 by weight. These proportions by weight are particularly suitable when the coagulant is aluminium sulphate as a hydrate, usually the octadecahydrate. With greater amounts of polymer there is increasing tendency for gel formation around the shaped bodies.

The rate of erosion is also influenced by the rate of solubility of the coagulant and of the polymer and thus the proportions and particle size of each component will be selected having regard to the dosage that is required in the suspension and to the rate of flow of the suspension. Small particles of coagulant will dissolve faster than larger particles. Reduction of the size of the flocculant particles, or increase of the molecular weight of the flocculant, will serve to retard disintegration of the block and, thus, entrainment of the flocculant and dissolution of the coagulant. However once the polymer particles are entrained in water the smaller polymer particles will dissolve into the water faster.

The particle size of the coagulant is generally in the range 25 to 2,000 $\mu$m, most preferably in the range 50 to 500 $\mu$m.

The particle size of the polymeric flocculant is usually below 750 $\mu$m and preferably below 400 and most preferably below 200 $\mu$m since larger particles may dissolve too slowly in the flowing stream. Preferably the particles are substantially all above 10 $\mu$m and it is often preferred that substantially all of the particles should be in the range 25 to 200 $\mu$m, often 25 to 100 $\mu$m.

The coagulant is preferably aluminium sulphate but can be any other solid multivalent metal salt suitable for coagulating suspended solids, for instance polyaluminium chloride, calcium chloride, magnesium chloride, calcium oxide or hydroxide, ferric sulphate or ferrous sulphate. It may be present as a compound that initially has a different valency state but which in solution will serve as a multivalent coagulant, e.g., sodium aluminate.

The flocculant can be any polymeric flocculant that can usefully be used to treat an aqueous suspension that has already been treated by inorganic coagulant. Preferably it is a bridging flocculant and so preferably it has a high molecular weight. Accordingly the molecular weight of the flocculant is generally above 500,000, and usually above 1 million. Its intrinsic viscosity is generally above 2, preferably above 4 and often above 10, e.g., up to 30 or higher.

The flocculant is generally a polymer of a water soluble ethylenically unsaturated (usually an acrylic) monomer, or a water soluble blend of such monomers. The monomers may be anionic or cationic or non-ionic or a blend.

Suitable non-ionic monomers are methacrylamide or, preferably, acrylamide.

Suitable anionic monomers include acrylic acid, methacrylic acid and 2-acrylamido-2-methyl propane sulphonic acid and other ethylenically unsaturated carboxylic or sulphonic acids, generally present as sodium or other water soluble salts. Sodium allyl sulphonate can be used.

Suitable cationic monomers are dialkylaminoalkyl -(meth) acrylates and -(meth) acrylamides, generally present as acid addition or quaternary ammonium salts, the preferred polymers being copolymers of dialkylaminoalkyl ethyl acrylate acid addition or quaternary salt copolymerised with acrylamide.

Other suitable monomers include dimethyl diallyl ammonium chloride.

Typical blends of monomers that can be used are blends of anionic and non-ionic monomers or of cationic and non-ionic monomers. The non-ionic monomer in such blends is generally acrylamide.

If it is desired for the polymer to be anionic, the monomer or monomer blend from which it is selected should be such that the polymer is not insolubilised by cross linking with the coagulant either within the block or during surface erosion. For this reason it is generally preferred for the anionic monomer to be an ethylenically unsaturated sulphonic monomer, especially 2-acrylamido-2-methyl propane sulphonic acid, and the polymer may then be a homopolymer or copolymer with acrylamide. If the anionic monomer is a carboxylic monomer, e.g., acrylic acid, the polymer is preferably a copolymer with at least 20% and preferably at least 40% by weight acrylamide. When polyacrylamide is used, it is preferably substantially non-ionic. For instance it may include low amounts of sodium acrylate groups, e.g., up to 5% or 10% by weight.

Best results are generally obtained with cationic polymers, generally copolymers of a cationic monomer and acrylamide, usually 20 to 90% by weight acrylamide.

The particulate polymeric flocculant may be made by gel polymerisation followed by comminution and drying, and separation of dried particles of the desired size. The comminution stage often gives a wide spread of particle sizes and for many industrial purposes the larger particles are preferred. An advantage of the invention is that the smaller particles, or the fines, can be utilised for making the shaped bodies.

Another way of making the polymer flocculant is by reverse phase polymerisation followed by drying and separation from the non-aqueous liquid in which the polymerisation is conducted, optionally accompanied by comminution of the particles. Again, very small substantially spherical particles that may not be desirable for other purposes are very satisfactory for use in the invention.

The shaped body can comprise a highly porous rigid housing filled with a free flowing mixture of the coagulant and flocculant particles of appropriate size relative to the size of the pores, since if the base of this housing is immersed in the flowing stream, the stream will erode the particles from the surface of the base into the flowing stream and the mixture will gradually move downwards within the housing to replenish the eroded surface.

It is greatly preferred for the mixture to be in the form of a shaped, self-sustaining body. Bonding of the mixture into this shaped body can be achieved by use of a bonding agent but, if so, the amount and nature of bonding agent must be such that it does not bond the polymer particles into a continuous network that prevents their release and that significantly inhibits the rate of erosion of the surface. It is therefore generally desirable to avoid the use of conventional polymeric binders. Instead, the shaped body preferably is a substantially dry compress of coagulant particles and flocculant particles. Thus the blocks are preferably made by blending dry particles of the coagulant with dry particles of the flocculant and then pressing them under sufficient pressure to form them into blocks, i.e., self-sustaining articles. Suitable pressures are at least 10 tonnes per $cm^2$.

The blocks may have any desired size and shape but often they are substantially oval. The minimum dimension is often at least 2 mm and usually at least 5 mm whilst the maximum dimension can be up to, for instance, 100 mm. Typically the bodies are ovoids. The bodies are often relatively small pellets, e.g., having a maximum dimension of 10 or 20 mm, but can be larger blocks, typical dimensions being from 5 to 20 mm, 10 to 30 mm and 30 to 70 mm.

It is generally preferred to immerse a plurality of relatively small shaped bodies in the flowing stream of suspension that is to be treated. In particular it is often preferred to hold a plurality of the shaped bodies in a highly permeable container, such as a mesh basket, and to immerse this basket wholly or partially within the flowing stream. Preferably the plurality of shaped bodies are arranged vertically within the container and the container is partially or wholly immersed in the stream. The stream is generally flowing through an open trough and the rate of dissolution can be adjusted by controlling the depth of immersion of the container. When the rate of flow increases, this will tend to increase the rate of erosion and if, as often occurs, the depth of the stream increases this will increase the surface area that is exposed to erosion, thereby further increasing the amount of coagulant and flocculant that is taken into solution.

The aqueous suspension that is treated can be any suspension of organic or inorganic solids that requires treatment with coagulant followed by flocculant. For instance the suspension can be a wool scouring effluent or an effluent containing inorganic solids from a manufacturing process, e.g., abrasive particles, or a mine effluent. The invention is of particular value for treating the run-off water from an open-cast coal mine.

EXAMPLE 1

Aluminium Sulphate/Polymer Pellets

Pellets are prepared, on a laboratory scale, using the following procedure:

Aluminium sulphate and polymer mixed together in the desired proportions. 5 grams of the mixture is taken and placed in a 32 mm diameter pellet die and pressed at 10 tonnes pressure for 5 seconds. The pellets produced are smooth and robust.

EXAMPLE 2

Pellets were prepared, as in Example 1, of the following compositions
  (1) 100% Aluminium sulphate
  (2) 95% Aluminium sulphate 5% Polymer I
  (3) 90% Aluminium sulphate 10% Polymer I
  (4) 95% Aluminium sulphate 5% Polymer II
  (5) 90% Aluminium sulphate 10% Polymer II
  Polymer I = Polyacrylamide
  Polymer II = Co-polymer containing 70 wt % acrylamide 30 wt % Quaternary ammonium salt of dimethyl amino ethyl acrylate Both polymers were produced by aqueous gel polymerisation followed by chopping, drying and comminuting of the gel.

These pellets were evaluated on a sample of 6% w/v coal tailings slurry observing the following test procedure:

500 $cm^3$ samples of slurry were taken in measuring cylinders. A pellet was placed in the slurry and the measuring cylinder was inverted 15 times to achieve flocculation of the slurry. The settlement rate of the solids was measured and the supernatant clarity determined by turbidimeter.

| Pellet Composition | Settlement Rate (cm/min) | Supernatant Clarity (NTU) |
| --- | --- | --- |
| (1) | 1.4 | 26 |
| (2) | 7.2 | 7 |
| (3) | 8.6 | 8 |
| (4) | 4.2 | 6 |
| (5) | 4.6 | 5 |

These results demonstrated significant advantages in terms of both settlement rate and supernatant clarity of the products of the invertion over aluminium sulphate alone.

EXAMPLE 3

Pellets were produced, as in Example 1, of the following compositions:

(6) 95% Aluminium sulphate 5% Polymer III
(7) 90% Aluminium sulphate 10% Polymer III
Polymer III = Co-polymer of 58 wt % acrylamide 42 wt % Quaternary ammonium salt of dimethyl amino ethyl acrylate.

The pellets were made by the same method as in Example 2 and evaluated as in Example 2 except that a 2% w/v suspension of kaolin was used as substrate.

| Pellet Composition | Settlement Rate (cm/min) | Supernatant Clarity (NTU) |
|---|---|---|
| (1) | 0.3 | 9 |
| (2) | 6.3 | 7.5 |
| (3) | 6.5 | 7 |
| (6) | 9.7 | 2.2 |
| (7) | 9.3 | 3 |

Again it can be seen that the product of the invention gives significantly superior performance to aluminium sulphate alone.

EXAMPLE 4

Pellets were prepared, using a continuous drum pelletiser, in the form of 5 to 20 mm ovoids. They were of the following compositions:

(8) 85% Aluminium Sulphate 15% of a mix of polymer fines approximating in composition to that of Polymer II
(9) 85% Aluminium Sulphate 15% of a mix of polymer fines approximating in composition to that of Polymer III.

An attempt was made to prepare foamed blocks after the method described in Japanese Examined Application No. 47-26584. This failed when it was found that on adding the dry powder mix to the foamed water, the foam collapsed leaving a semi gellatinous mass. A further attempt was therefore made, using a slightly modified technique, to produce foamed pellets as described in 47-26584. This involved first adding the dry powder mix to a homogeniser which was switched on and left running while water containing foaming agent was added. A foamed mixture, which could be kneaded into foamed pellets of 5 to 10 mm, was produced with each pellet having the following composition:

| Aluminium Sulphate.16H$_2$O | 60% |
| Sodium Alginate | 3% |
| Polymer Fines | 27% |
| Water | 10% |
| Foaming Agent | <1% |

Four different high molecular weight polymer compositions were used as follows:
(10) 70 wt % Acrylamide 30 wt % Quaternary ammonium salt of DMAEA
(11) 58 wt % Acrylamide 42 wt % Quaternary ammonium salt of DMAEA
(12) 37 wt % Acrylamide 63 wt % Quaternary ammonium salt of DMAEA
(13) 20 wt % Acrylamide 80 wt % Quaternary ammonium salt of DMAEA The blocks so formed were then dried. The pellets were then evaluated as in Example 2. Those of compositions (8) and (9) showed some tendency towards formation of a gel film at low flow rates because of their relatively high polymer contents, but still underwent sufficient erosion of the surfae, and liberation of polymer particles, to give useful results. The pellets of compositions (10) to (13) gave worse results, demonstrating that the described combination of the bonding method and the polymer amount leads to unsatisfactory results and, in particular, does not give adequate surface erosion and liberation of polymer particles.

| Pellet/Block Composition | Settlement Rate (cm/min) | Supernatant Clarity (NTU) |
|---|---|---|
| 8 | 8.4 | 29 |
| 9 | 7.8 | 22 |
| 10 | 5.8 | 31 |
| 11 | 5.4 | 49 |
| 12 | 4.7 | 27 |
| 13 | 3.9 | 31 |

We claim:

1. A shaped body which comprises a shape retaining mixture of 50 to 99% by volume water soluble multivalent metal coagulant particles having a size of 25 to 2000 microns and 50 to 1% by volume water soluble organic polymeric floccculant and in which the polymeric flocculant is in the form of substantially discrete particles having a size of 10 to 750 microns and the surface of the body is erodable by immersion in a flowing stream of water to form a solution of the coagulant in which the polymeric flocculant particles are entrained and subsequently dissolved.

2. A shaped body according to claim 1 in which the mixture is a substantially dry copress of the coagulant particles and the flocculant particles and which is substantially free of polymeric binder.

3. A shaped body according to claim 1 comprising a shape-retaianing mixture of the coagulant and the flocculant particles in the ratio by volume of at least 80:20.

4. A shaped body according to claim 1 comprising a shape-retaining mixture of the coagulant and the flocculant particles in a ratio by volume of at least 87:13.

5. A shaped body according to claim 1 comprising a shape-retaining mixture of the coagulant and the flocculant particles in the ratio by weight of at least 90:10.

6. A shaped body according to claim 5 in which the flocculant particles have a size of 25 to 100 microns.

7. A shaped body according to claim 6 in which the mixture is a substantially dry compress of coagulant particles and flocculant particles and which is substantially free of polymeric binder.

8. A shaped body according to claim 1 in which the coagulant is aluminium sulphate hydrate.

9. A shaped body according to claim 1 in which the polymeric flocculant is a non-ionic or cationic polymer of one or more monoethylenically unsaturated monomers and has molecular weight above 500,000.

10. A shaped body according to claim 1 in which the flocculant particles have a particle size of 10 to 200 microns and the ratio by volume of coagulant particles to flocculant particles is 80:20 to 99:1.

11. A method of treating an aqueous suspension with a multivalent metal coagulant and then with an organic polymeric flocculant comprising flowing the suspension past a shaped body comprising a shape retaining mixture of 50 to 99% by volume water soluble multivalent metal coagulant particles having a size of 25 to 2000 microns and 50 to 1% by volume water soluble polymeric flocculant, and in which the flocculant is in the form of discret particles having a size of 10 to 750 microns and the flowing stream erodes the body by dissolving the coagulant and thereby releasing the polymer particles from the body, and the particles are entrained in and gradually dissolved into, the flowing stream to achieve flocculation of said suspension.

12. A method according to claim 11 in which the shaped body is a substantially dry compress of particles of the coagulant and the flocculant particles and is substantially free of polymmeric binder.

13. A method according to claim 11 in which the ratio by volume coagulant:polymer is at least 87:13.

14. A method according to claim 11 in which the shaped body has flocculant particles of a size of 10 to 200 microns and the ratio by volume of coagulant particles to flocculant particles is 80:20 to 99:1.

* * * * *